US008315206B2

(12) United States Patent
Mizukoshi (10) Patent No.: US 8,315,206 B2
(45) Date of Patent: Nov. 20, 2012

(54) PROXY MOBILE IP SYSTEM, ACCESS GATEWAY AND METHOD FOR DETERMINING THE ORDER OF REGISTRATION NOTIFICATION MESSAGES USED THEREFOR

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 278 days.

(21) Appl. No.: 12/676,565

(22) PCT Filed: Sep. 4, 2008

(86) PCT No.: PCT/JP2008/065973
§ 371 (c)(1),
(2), (4) Date: Mar. 4, 2010

(87) PCT Pub. No.: WO2009/031616
PCT Pub. Date: Mar. 12, 2009

(65) Prior Publication Data
US 2010/0202350 A1 Aug. 12, 2010

(30) Foreign Application Priority Data

Sep. 5, 2007 (JP) ................................ 2007-229628

(51) Int. Cl.
*H04W 4/00* (2009.01)
(52) U.S. Cl. .................................. 370/328; 455/435.1
(58) Field of Classification Search ........................ None
See application file for complete search history.

(56) References Cited

U.S. PATENT DOCUMENTS 7,701,896 B1 * 4/2010 Chowdhury et al. ......... 370/328
7,818,002 B2 * 10/2010 Bajko et al. ................ 455/435.1

2002/0191562 A1 * 12/2002 Kumaki et al. ............... 370/331
2004/0005886 A1 * 1/2004 Oda et al. .................... 455/422.1
2004/0137888 A1 * 7/2004 Ohki .............................. 455/417
2004/0166857 A1 * 8/2004 Shim et al. ..................... 455/436
2007/0177546 A1 * 8/2007 Lee ................................ 370/331
2007/0186100 A1 * 8/2007 Wakameda .................... 713/160
2007/0288997 A1 * 12/2007 Meier et al. ....................... 726/4
2008/0076420 A1 * 3/2008 Khetawat et al. .......... 455/435.1

(Continued)

FOREIGN PATENT DOCUMENTS

JP      8-274812 A    10/1996
JP      2005198153 A   7/2005

OTHER PUBLICATIONS

International Search Report for PCT/JP2008/065973 mailed Sep. 30, 2008.
S. Gundavelli et al., "Proxy Mobile IPv6 draft-ietf-netlmm-proxymip6-01.txt", NETLMM WG, Internet-Draft, Jun. 18, 2007, pp. 1-49, <http://www.ietf.org/internet-drafts/draft-ietf-netlmm-proxymip6-0.1.txt>.

(Continued)

*Primary Examiner* — Anh-Vu Ly (57) ABSTRACT

A proxy mobile IP system comprises: a mobile terminal including a time management/notification unit; the time management/notification unit alerting time information, managed by the mobile terminal itself, to an access gateway at the time of access authentication in proxy mobile IP (Internet Protocol) communication; the access gateway; the access gateway including a time information acquisition/management unit alerting the time information, received from the mobile terminal, to a mobility anchor, at the time of performing proxy mobile IP registration in the proxy mobile IP communication, as the time information received from the mobile terminal is carried on a registration notification message; and the mobility anchor; the mobility anchor including a time information acquisition/management unit alerting the registration notification message including the time information to a proxy mobile IP registration unit responsible for performing proxy mobile IP registration.

8 Claims, 8 Drawing Sheets

U.S. PATENT DOCUMENTS

2008/0182576 A1* 7/2008 Tsirtsis et al. ............. 455/435.1
2008/0247360 A1* 10/2008 Tinnakornsrisuphap
 et al. ............................ 370/331
2010/0208657 A1* 8/2010 Mizukoshi ................... 370/328

OTHER PUBLICATIONS

"[netlmm] Issue: Timestamp vs Sequence Number based logic", Internet, extracted Jul. 5, 2007, <http://www1.ietf.org/mail-archive/web/netlmn/current/msg02106.html>.

* cited by examiner

-- PRIOR ART --

PROXY MOBILE IP SYSTEM, ACCESS GATEWAY AND METHOD FOR DETERMINING THE ORDER OF REGISTRATION NOTIFICATION MESSAGES USED THEREFOR

REFERENCE TO RELATED APPLICATION

The present application is the National Phase of PCT/JP2008/065973, filed Sep. 4, 2008, which claims priority rights of the Patent Application No. 2007-229628, filed in Japan on Sep. 5, 2007. The total disclosure of this patent application of the senior filing data are to be incorporated herein by reference.

TECHNICAL FIELD

This invention relates to a proxy mobile IP system, an access gateway and a mobility anchor, and also to a method for determining the order of registration notification messages used therefor. More particularly, it relates to a proxy mobile IP system that determines the order of the registration notification messages for proxy mobile IP (Internet Protocol) communication that performs mobile terminal position management over a communication network.

BACKGROUND

So far, a separate movement management control system has been used from one mobile phone network system to another. It is contemplated nowadays to render it possible to apply the IP in the inter-conversion among packet networks of respective systems. In addition, such a system that allows for inter-operability among different radio network mediums has been a desideratum.

It is thus contemplated to implement such system in accordance with a proxy mobile IP system now being standardized by IFTF (Internet Engineering Task Force) for a movement management control system such as a mobile phone network or the WiMAX (Worldwide Interoperability for Microwave Access) network.

Figure 6:
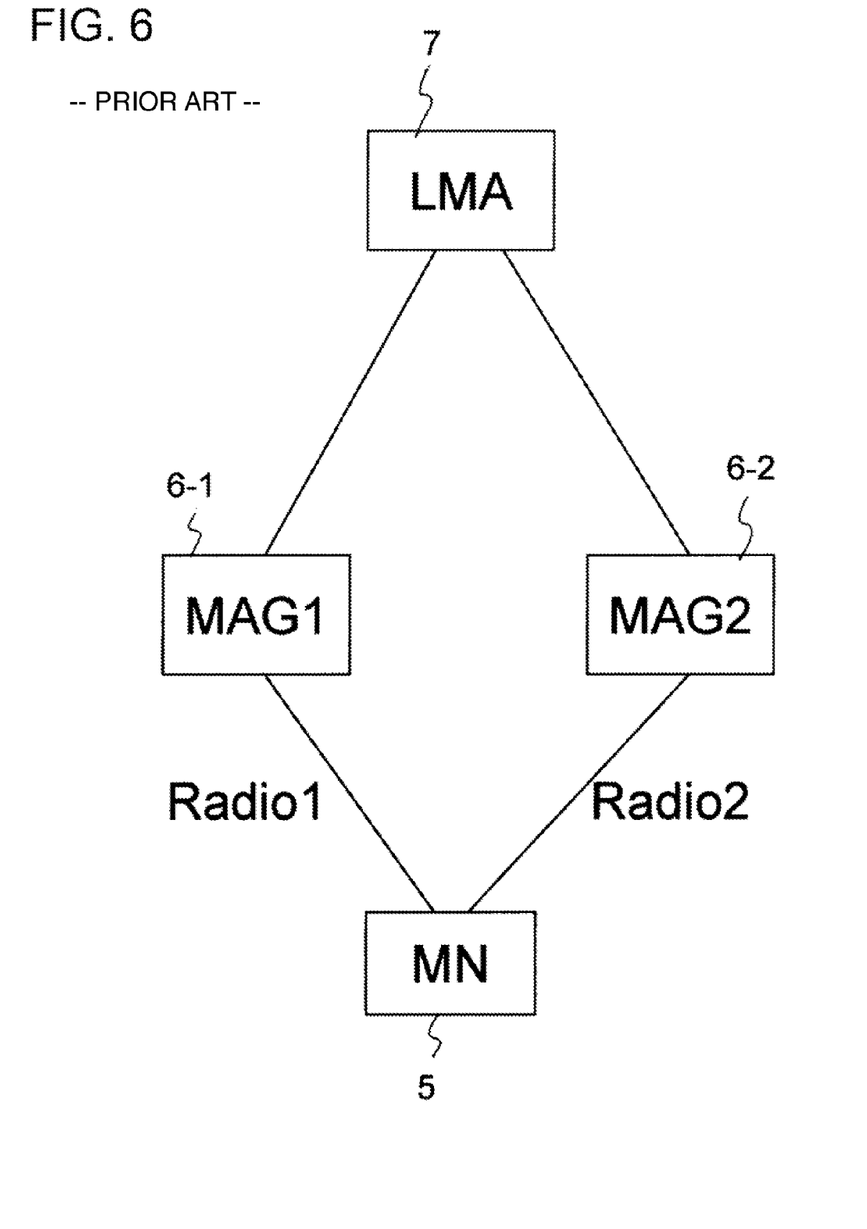

FIG. 6 shows a schematic configuration example of the system according to the proxy mobile IP system. Referring to FIG. 6, the system is composed of an MN (Mobile Node) 5, a MAG (Mobile Access Gateway) (1) 6-1, a MAG (Mobile Access Gateway) (2) 6-2 and an LMA (Localized Mobility Anchor) 7. The MN 5 may have communication via a radio communication domain Radio1 and further connection to the LMA 7 over the MAG (1) 6-1. The MN 5 also may have communication via a radio communication domain Radio2, and further connection to the LMA 7 over the MAG (2) 6-2.

With the mobile IP system, a mobile terminal registers a care of address (CoA), dependent on the network of the movement destination, using a registration notification message. A home agent sends an IP packet, addressed to a home address of the mobile terminal, to a care of address.

However, in applying the mobile IP system to a mobile phone network, there is raised a problem that, since the mobile terminal needs to possess a mobile IP control function, it is not possible to perform the movement management of the mobile terminal not having the mobile IP control function. There is also raised a problem that, in a collocate care of address (CCoA) system of IPv4 (Internet Protocol version 4) or in the IPv6 (Internet Protocol version 6) system, the IP encapsulation communication is needed in the domain of the radio communication, thus wasting the radio resource in an amount corresponding to the IP header.

Figure 7:
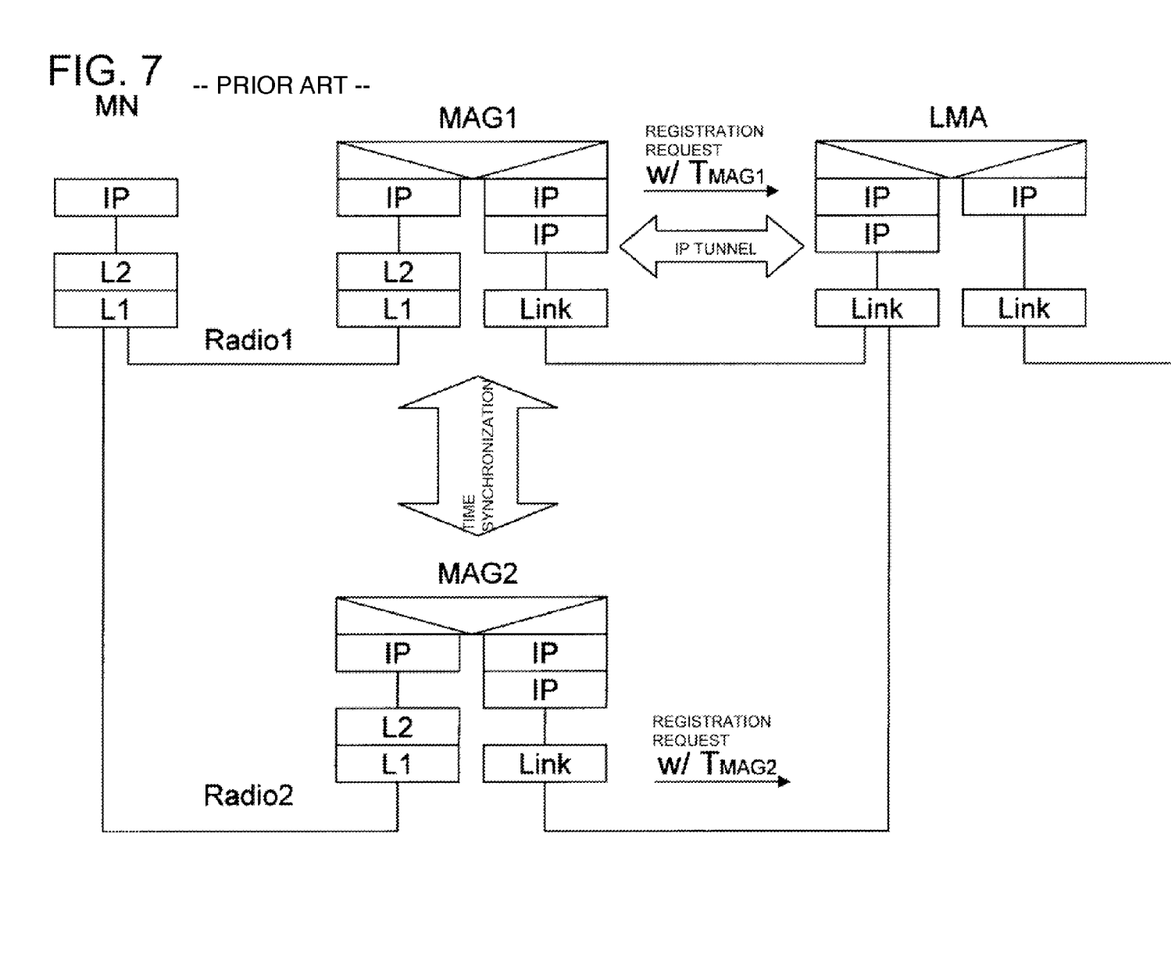
FIG. 7 is a block diagram showing schematics of a system that uses time synchronization between the MAGs.

The proxy mobile IP system is now under study in order to meet a demand that, as the control protocol of the mobile IP system is used, no special function is required of the mobile terminal, such that IP encapsulation communication is unnecessary in the radio communication domain (FIG. 7). Specified systems therefor are disclosed in Non-Patent Document 1 indicated below.

FIG. 7 shows that, if the MAG 1 and the MAG 2 are synchronized with each other, it is possible to manage order control when the MAG 1 and the MAG 2 send registration requests to the LMA. As a result of the registration requests, an IP tunnel is formed between the MAG and the LMA, so that IP packets may be transmitted encapsulated.

The IP packet, transmitted encapsulated from the LMA, is decapsulated by the MAO and transmitted in this state to the mobile terminal MN. A packet from the mobile terminal MN gets to the LMA by a reverse procedure to that described above.

The proxy mobile IP system operates as follows: The MAG is placed intermediate between a home agent and a mobile terminal. When the MAG has detected that the mobile terminal has moved into an area of an access network under the MAG's control, the MAG performs the registration, on behalf of the mobile terminal, in a home agent, in accordance with the proxy mobile IP system. An IP address of the MAG is used at this time as the care of address.

An IP packet, addressed to the home address of the mobile terminal, is transmitted from the home agent to the MAG, using IP encapsulation communication established between the home agent and the MAG. This MAG takes out the IP packet, addressed to the mobile terminal, and transmits the so taken out IP packet to the mobile terminal, using the radio link communication means between the MAG and the mobile terminal.

In handover processing, performed when the mobile terminal has moved to an area of another new MAG, the new MAG detects movement of the mobile terminal and performs registration in the home agent in accordance with the proxy mobile IP system. Since this proxy mobile IP system is such a system in which different MAGs perform the registration on behalf of the mobile terminal, there exists a plurality of sources of transmission of the registration notification messages.

Because of differential transmission delays between the respective MAGs and the home agent, there are cases where the order of the registration notification messages from the old and new MAGs is reversed when the messages arrive at the home agent. In a known manner, there persists a problem that, when the registration notification message from the old MAG has arrived at a belated timing, the IP packet is not sent to the new MAG.

In the mobile IP system, the mobile terminal appends a sequential number to the registration notification message to avoid the problem of order reversal. However, in the proxy mobile IP system, in which the scheme of global sequential number management may not be implemented, there persists the problem of order reversal.

Several solutions to overcome the problem of order reversal of registration notification messages are under research by the NETLMN WG (Network-based Localized Mobility Management Working Group of IFTF). In Non-Patent Document 2, indicated below, there are proposed five concrete solutions:

According to the first solution, a plurality of MAGs are synchronized with one another, using a time server, and the timing information is appended to the respective registration notification messages. A home agent performs order decision based on the timing information entered in the registration notification messages. This solution suffers a problem that synchronization to high accuracy is necessary.

According to the second solution, it is detected whether or not a registration notification message from an old MAG arrives within a predetermined time as from end of processing of the registration notification message from a new MAG. Only the first request from the old MAG is discarded. This solution suffers a problem that it depends on timer re-send processing of the old MAG, so that the processing is protracted, and another problem that a registration notification message from a new MAG, if any, is prioritized.

According to the third solution, the problem of the second solution that it depends on the timer re-send processing of the old MAG is to be overcome. It is thus detected whether or not a registration notification message from an old MAG arrives within a predetermined time after processing a registration notification message from a new MAG. The home agent explicitly returns an error only upon detection for the first time. The old MAG performs the registration again if a mobile terminal attaches to it and is under its control. This third solution suffers a problem that, if the registration notification message has arrived from the new MAG, it is prioritized.

According to the fourth solution, a new MAG performs initial registration when it has established a radio link and performs processing again after it has succeeded in the initial registration. That is, the MAG sends the registration notification message twice. This fourth solution suffers a problem that excess registration packets are necessary.

According to the fifth solution, a home agent returns an error in response to an initial registration notification message from a new MAG. At the same time, the home agent alerts a correct sequence number to the new MAG, which new MAG again performs registration using a correct sequential number. This fifth solution suffers a problem that excess registration packets are necessary.

[Non-Patent Document 1] "Proxy Mobile IPv6 draft-ietf-netlmm-proxymip6-0.1 txt" (NETLMM WG, Jun. 19, 2007)

[Non-Patent Document 2] "[netlmn] Issue:Timestamp vs Sequence Numbwe based logic"

SUMMARY

The disclosures of the Non-Patent Documents 1 and 2 are to be incorporated herein by reference. The following analysis is made by the present invention.

In the proxy mobile IP system, the present invention is relevant to, the home agent is unable to determine the order of the registration notification messages as sent from the MAGs. Hence, the late arriving registration notification message is processed last and registered for addressing to the old MAG Hence, with the proxy mobile IP system, to which the present invention is relevant, different propagation delays are caused on transmission paths from a plurality of MAGs to the home agent when the handover of a mobile terminal occurs through movement thereof between the respective MAGs. If the propagation delays between new MAGs and the home agent are longer than the propagation delay between an old MAG and the home agent by a time difference caused in the respective MAGs in sending their registration notification messages, the mobile terminal, moved into areas of the new MAG, becomes unable to have communication (see e1 to e4 of FIG. 8).

Figure 8:
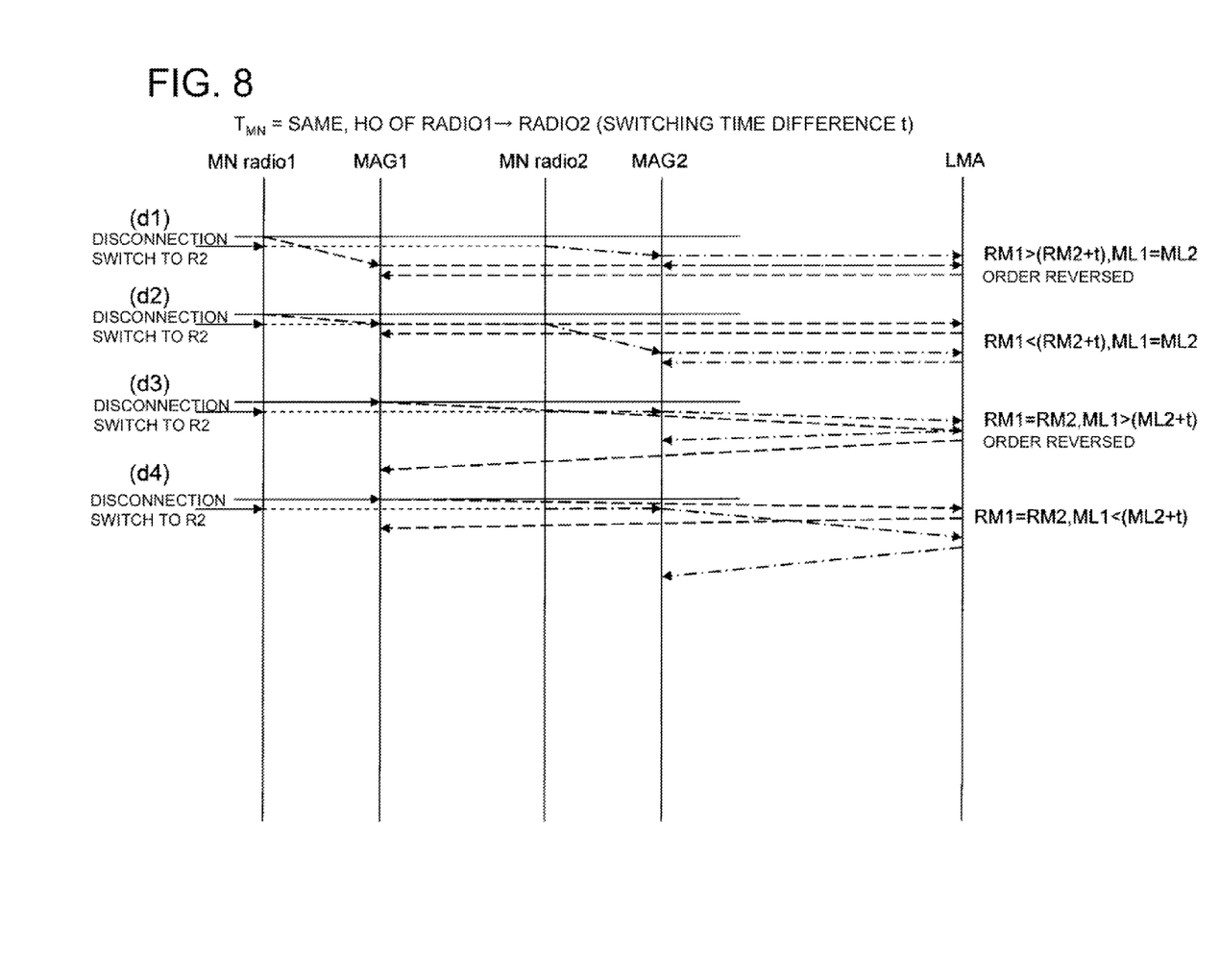
FIG. 8 is a sequence chart showing a problem that arises with the use of time synchronization.

FIG. 8 shows possible occurrences of order reversal of the registration notification messages for a switching time difference t between radio communication domains Radio1 and Radio2, transmission time RM1 between the radio communication domains Radio1 and MAG 1, transmission time RM2 between the radio communication domain Radio2 and the MAG 2, transmission time ML1 between the MAG 1 and the LMA, and transmission time ML2 between the MAG 2 and the LMA.

Initially, the MN is under communication over the radio communication domain Radio1 and, after time t, begins communication over the radio communication domain Radio2. A pattern d1 shows that, if the transmission time RM1 between the radio communication domain Radio1 and the MAG 1 is longer than a sum of the transmission time RM2 between the radio communication domain Radio2 and the MAG 2 and time t [RM1>(RM2+t), ML1=ML2], an order reversal between the two registration notification messages occurs.

A pattern d2 shows that, since the transmission time RM1 between the radio communication domain Radio1 and the MAG 1 is shorter than the sum of the transmission time RM2 between the radio communication domain Radio2 and the MAG 2 and time t [RM1<(RM2+t), ML1=ML2], there occurs no order reversal between the two registration notification message.

A pattern d3 shows that, if the transmission time ML1 between the MAG 1 and the LMA is longer than the sum of the transmission time ML2 between the MAG 2 and the LMA [RM1=RM2, ML1>(ML2+t)], the order reversal between the two registration notification messages occurs.

A pattern d4 shows that, since the transmission time ML1 between the MAG 1 and the LMA is shorter than the sum of the transmission time ML2 between the MAG 2 and the LMA and time t [RM1=RM2, ML1<(ML2+t)], there occurs no order reversal between the two registration notification messages.

It should be noted that, if the MAG 1 and the MAG 2 are correctly synchronized to each other, order reversal of the registration notification messages with the pattern d3 can be detected, however, that with the pattern d1 can not be detected.

Moreover, with the proxy mobile IP system, to which the present invention is relevant, such a case where the timing difference between the timings at which the respective MAGs sent the respective registration notification messages be of an extremely short time is unavoidably beset with a problem unless perfect synchronization is achieved. Hence, the problem of order reversal cannot be resolved even if the MAG's timing information is used with the above mentioned first solution.

It is therefore an object of the present invention to overcome the above mentioned problem and to provide a proxy mobile IP system according to which order reversal of the registration notification messages may readily be detected by the LMA, at the time of switching between different MAGs at the mobile terminal, without necessitating highly accurate synchronization between the MAGs. It is also contemplated by the present invention to provide a corresponding access gateway, a corresponding mobility anchor, and a corresponding method for determining the order of registration notification messages.

In a first aspect, the present invention provides a proxy mobile IP (Internet Protocol) system and equipment constituting the system, in which the order of registration notification messages may be determined by the following elements. A mobile terminal includes a time management/notification unit alerting time information, managed by the mobile terminal itself, to the access gateway at the time of access authentication in proxy mobile IP (Internet Protocol) communication. The access gateway includes a time information acquisition/management unit alerting the time information, received from the mobile terminal, to a mobility anchor at the time of performing proxy mobile IP registration in the proxy mobile IP communication, as the time information received from the mobile terminal is carried on a registration notification message. The mobility anchor includes a time information acquisition/management unit alerting the registration notification message including the time information to a proxy mobile IP registration unit responsible for performing proxy mobile IP registration.

In a second aspect, the present invention provides a method for determining order of registration notification messages in proxy mobile IP (Internet Protocol) communication. The method includes a step of a mobile terminal alerting the time information, managed by the mobile terminal itself, to an access gateway at the time of access authentication. The method also includes a step of the access gateway alerting the time information, received from the mobile terminal, to a mobility anchor at the time of performing proxy mobile IP registration, as the time information received from the mobile terminal is carried on a registration notification message. The method also includes a step of the mobility anchor alerting the registration notification message including the time information to a proxy mobile IP registration unit responsible for performing proxy mobile IP registration.

In a third aspect, the present invention provides a proxy mobile IP system including a mobile terminal, an access gateway and a mobility anchor, each of which has following elements. The order of registration notification messages from the access gateway in proxy mobile IP (Internet Protocol) communication, responsible for location management of the mobile terminal over a communication network, is determined by the mobility anchor.

The mobile terminal includes a time management/notification unit managing the time information of the mobile terminal itself. The time management/notification unit works in association with an access authentication function responsible for access authentication in the proxy mobile IP communication.

The access gateway includes a time information acquisition/management unit configured for acquiring the time information of the mobile terminal. The time information acquisition/management unit works in association with a proxy mobile IP registration unit performs proxy mobile IP registration in the IP proxy mobile IP communication by the access authentication function and by the registration notification message.

The mobility anchor includes a time information acquisition/management unit configured for acquiring the time information of the mobile terminal. The time information acquisition/management unit works in association with a proxy mobile IP registration unit performs proxy mobile IP registration in the IP proxy mobile IP communication by the registration notification message.

The access gateway alerts the time information, acquired from the mobile terminal by an access authentication sequence by the proxy mobile IP registration unit, to the mobility anchor as the time information is carried on the registration notification message.

In a fourth aspect, the present invention provides the access gateway having the above mentioned time information acquisition/management unit.

In a fifth aspect, the present invention provides the mobility anchor having the above mentioned time information acquisition/management unit.

In a sixth aspect, the present invention provides the mobile terminal having the above mentioned time management notification unit.

In a seventh aspect, the present invention provides a method for determining order of registration notification messages in a proxy mobile IP system including a mobile terminal, an access gateway and a mobility anchor, each of which has following elements. The order of registration notification messages from the access gateway in proxy mobile IP (Internet Protocol) communication, responsible for location management of the mobile terminal over a communication network, is determined by the mobility anchor.

The mobile terminal includes a time management/notification unit managing the time information of the mobile terminal itself. The time management/notification unit works in association with an access authentication function responsible for access authentication in the proxy mobile IP communication.

The access gateway includes a time information acquisition/management unit configured for acquiring the time information of the mobile terminal. The time information acquisition/management unit works in association with a proxy mobile IP registration unit performs proxy mobile IP registration in the IP proxy mobile IP communication by the access authentication function and by the registration notification message.

The mobility anchor includes a time information acquisition/management unit configured for acquiring the time information of the mobile terminal. The time information acquisition/management unit works in association with a proxy mobile IP registration unit performs proxy mobile IP registration in the IP proxy mobile IP communication by the registration notification message.

The access gateway alerts the time information, acquired from the mobile terminal by an access authentication sequence by the proxy mobile IP registration unit, to the mobility anchor as the time information is carried on the registration notification message.

The meritorious effects of the present invention are summarized as follows.

According to the present invention, having the above configuration and operation, order reversal of the registration notification messages may readily be detected by the LMA, when the mobile terminal switches between different MAGs, without necessitating high precision time synchronization between the MAGs.

BRIEF DESCRIPTION OF THE DRAWINGS

FIG. 6 is a block diagram showing an example system configuration of the proxy mobile IP system the present invention is relevant to.

PREFERRED MODES

Figure 1:
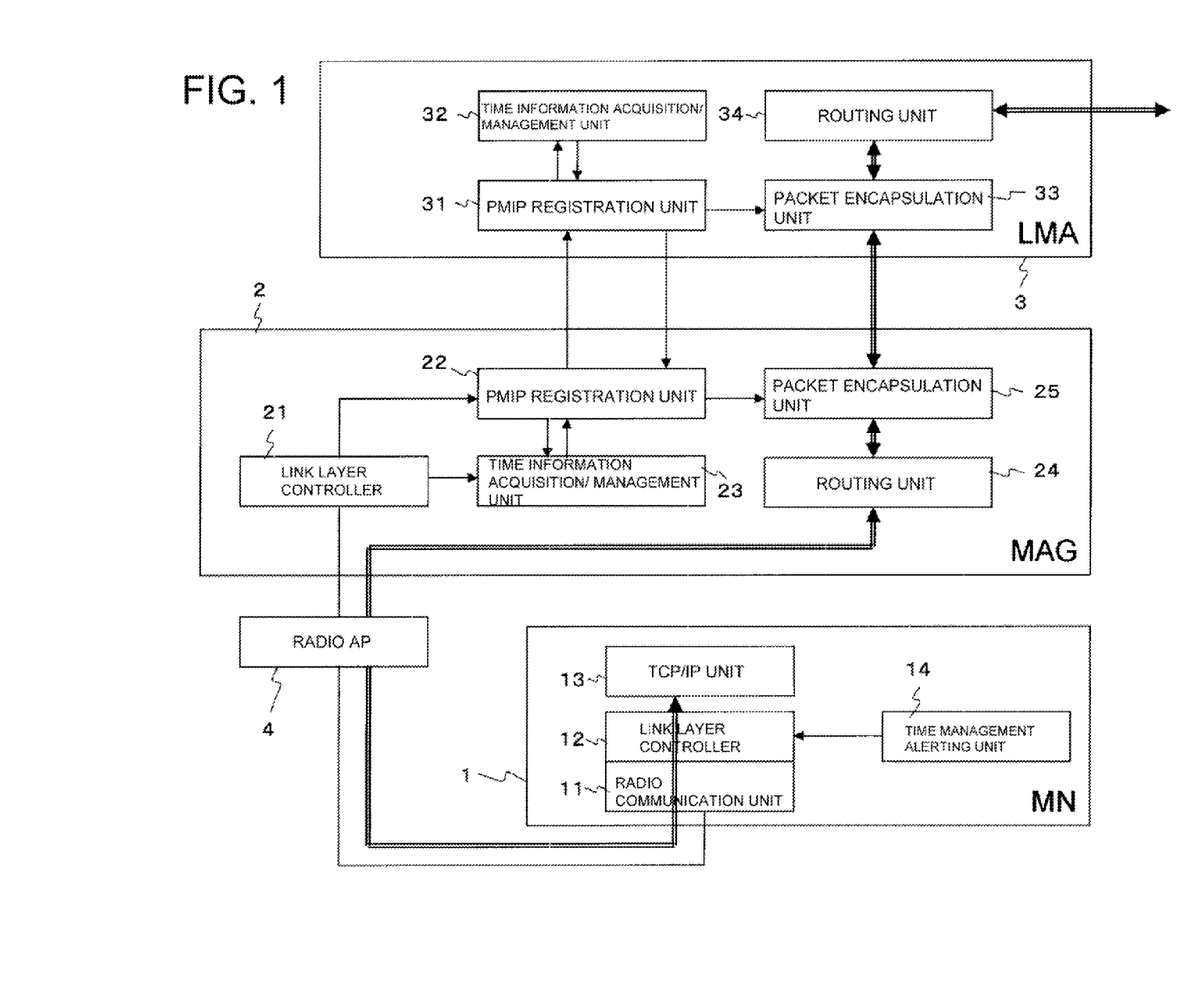
FIG. 1 is a block diagram showing a configuration of an example configuration of a proxy mobile IP system according to an exemplary embodiment of the present invention.

An exemplary embodiment of the present invention will now be described with reference to the drawings. FIG. 1 depicts a block diagram showing an example formulation of a proxy mobile IP system according to an exemplary embodiment of the present invention. Referring to FIG. 1, a proxy mobile IP system of the present exemplary embodiment includes an MN (Mobile Node) 1, a MAG (Mobile Access Gateway) 2, an LMA (Localized Mobility Anchor) 3 and a radio AP (Access Point) 4.

The MN 1 is made up of a radio communication unit 11, a link layer controller 12, a TCP/IP (Transmission Control Protocol/Internet Protocol) unit 13 and a time management alerting unit 14.

The MAG 2 is made up of a link layer controller 21, a PMIP (Proxy Mobile IP) registration unit 22, a time information acquisition/management unit 23, a routing unit 24 and a packet encapsulation unit 25.

The LMA 3 is made up of a PMIP registration unit 31, a time information acquisition/management unit 32, a packet encapsulation unit 33 and a routing unit 34.

In the present exemplary embodiment, it is contemplated to remove the above mentioned inconveniences proper to the proxy mobile IP system, the present invention is relevant to. In particular, in determining the order of the registration notification messages, using the timing information in the proxy mobile IP communication, the order of the registration notification is determined by the mobile terminal (MN 1) alerting the timing information of the mobile terminal itself to the MAG 2.

In the exemplary embodiment of the present invention, the link layer controller 12 of the MN 1 is extended to possess a time management alerting unit 14. The link layer controller 21 and the PMIP registration unit 22 of the MAG 2 are extended to possess the time information acquisition/management unit 23, and the PMIP registration unit 31 is extended to possess the time information acquisition/management unit 32.

In the proxy mobile IP system of the exemplary embodiment of the present invention, the MN 1, MAG 2, LMA 3 and the radio AP 4 go to make up a system configuration similar to that of the proxy mobile IP system of FIG. 6, in a manner not shown in the drawings. The system of FIG. 6 is relevant to the system of the present invention. In the case of the present exemplary embodiment, two MAGs, one of which is shown as MAG 2, are referred to as MAG (1)2-1 and MAG (2)2-2.

Figure 2:
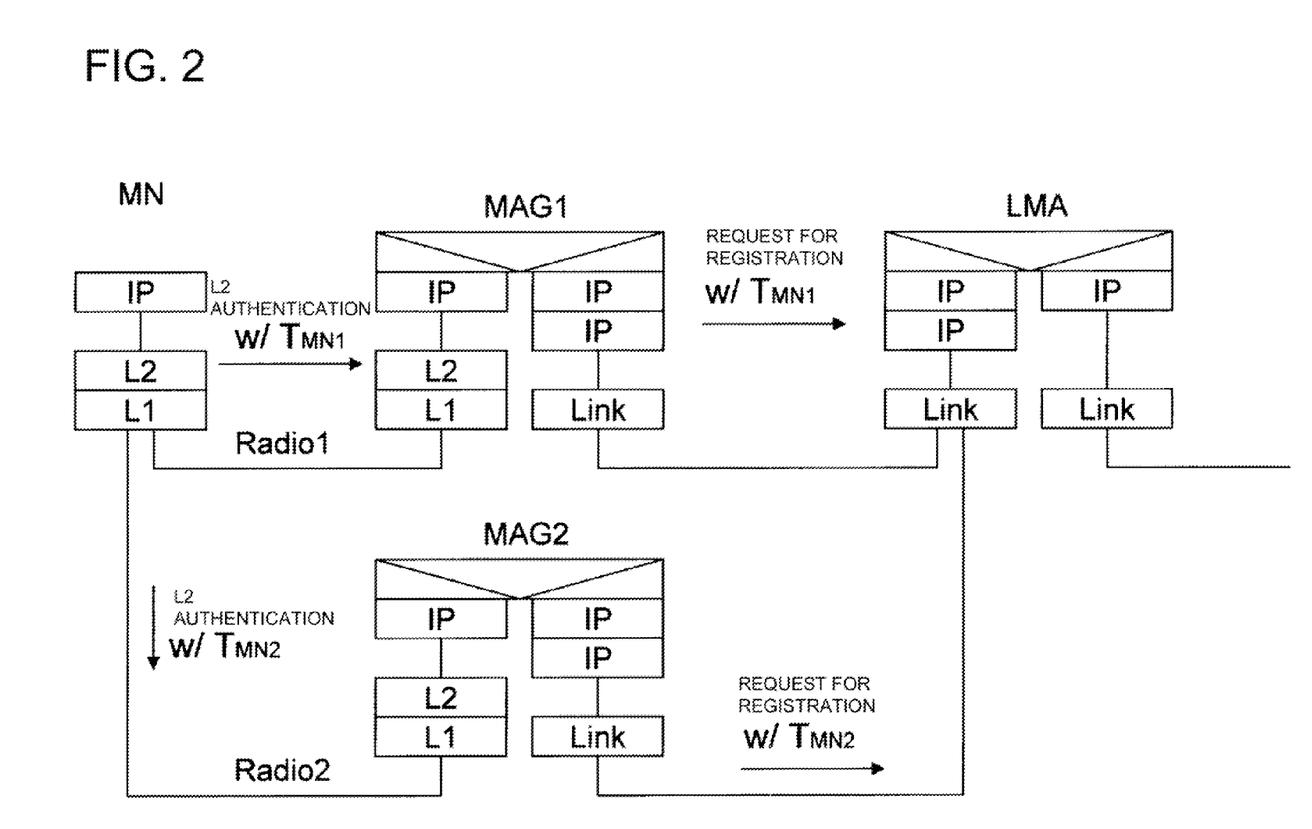
FIG. 2 is a block diagram showing the routing for LMA-MN of FIG. 1 and the layers for encapsulation of MAGs-MN.

FIG. 2 illustrates the routing for the LMA 3-MN 1 and layers for encapsulation for the MAG 2-MN 1 of FIG. 1. In the present exemplary embodiment, the timing information for the MN 1 (time information w/TMN1 and w/TMN2) is alerted to the MAG (1)2-1 and the MAG (2)2-2 in the procedure of link layer recognition (L2 authentication) between the MN 1 on the one hand and the MAG (1)2-1 and the MAG (2) 2-2 on the other hand, as shown in FIG. 2. The timing information (the timing information w/TMN1 and w/TMN2) is transmitted entered in a registration notification message from each of the MAG (1)2-1 and the MAG (2)2-2 to the LMA 3. Hence, time synchronization between the MAG (1)2-1 and the MAG (2)2-2 is not crucial.

In the operation of the present exemplary embodiment, as in the case of FIG. 7, an IP tunnel is generated between the MAG and the LMA as a result of the above mentioned request for registration. An IP packet is then encapsulated and transmitted. An IP packet, transmitted encapsulated from the LMA, is decapsulated in the MAG and transmitted in this state to the mobile terminal (MN). A packet from the mobile terminal gets to the LMA in the reverse sequence to that described above.

Figure 3:
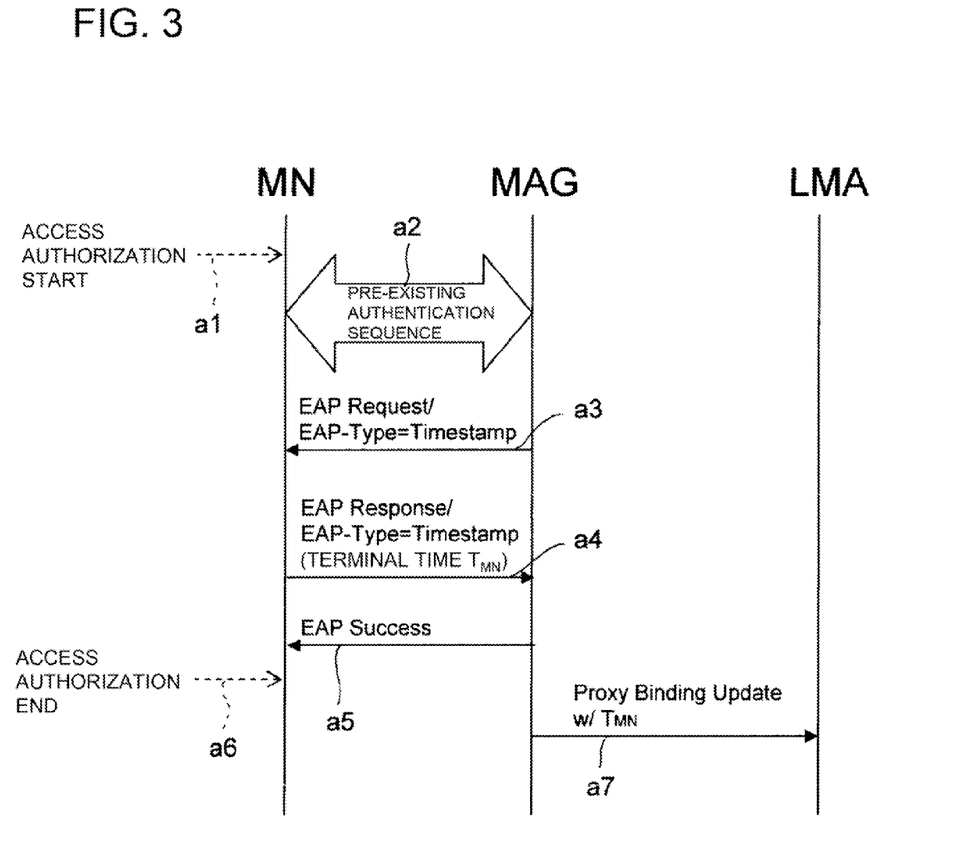
FIG. 3 is a sequence chart showing the operation sequence at the time of initial connection according to an exemplary embodiment of the present invention.

FIG. 3 depicts a sequence chart for illustrating an operation sequence at the time of initial connection in the exemplary embodiment of the present invention. Referring to FIGS. 1 to 3, the operation of the proxy mobile IP system in the present exemplary embodiment will now be described.

When the mobile terminal (MN1) starts its access authentication (a1 of FIG. 3), a pre-existing sequence or procedure for user authentication, such as EAP (Extensible Authentication Protocol)—TTLS (Tunnelled Transport Layer Security) or EAP—PEAP (Protected Extensible Authentication Protocol), is in operation (a2 of FIG. 3). This sequence for authentication is known and hence is not here described.

In the present exemplary embodiment, the time information acquisition/management unit 23 of the MAG 2 sends EAP Request/EAP-Type=Timestamp to the MN1 before the end of the access authentication following the pre-existing user authentication. The EAP Request/EAP-Type=Timestamp is as defined in the present exemplary embodiment. The time information acquisition/management unit 23 thus requests the time information managed by the MN 1 (a3 of FIG. 3).

On receipt of the EAP Request/EAP-Type=Timestamp, the MN 1, having the time management alerting unit 14, responds thereto as it carries the time information (terminal time TMN), managed by the MN 1, on the EAP Request/EAP-Type=Timestamp (a4 of FIG. 3).

When the MAG 2 has acquired the time information of the MN 1, the MAG 2 sends EAP Success to the MIN 1 (a5 of FIG. 3) to terminate the access authentication (a6 of FIG. 3). The MAG 2 then carries the time information of the MN 1 (w/TMN) on Proxy Binding Update, which is a registration notification message. The MAG 2 then transmits the message to the LMA 3 (a7 of FIG. 3).

Figure 4:
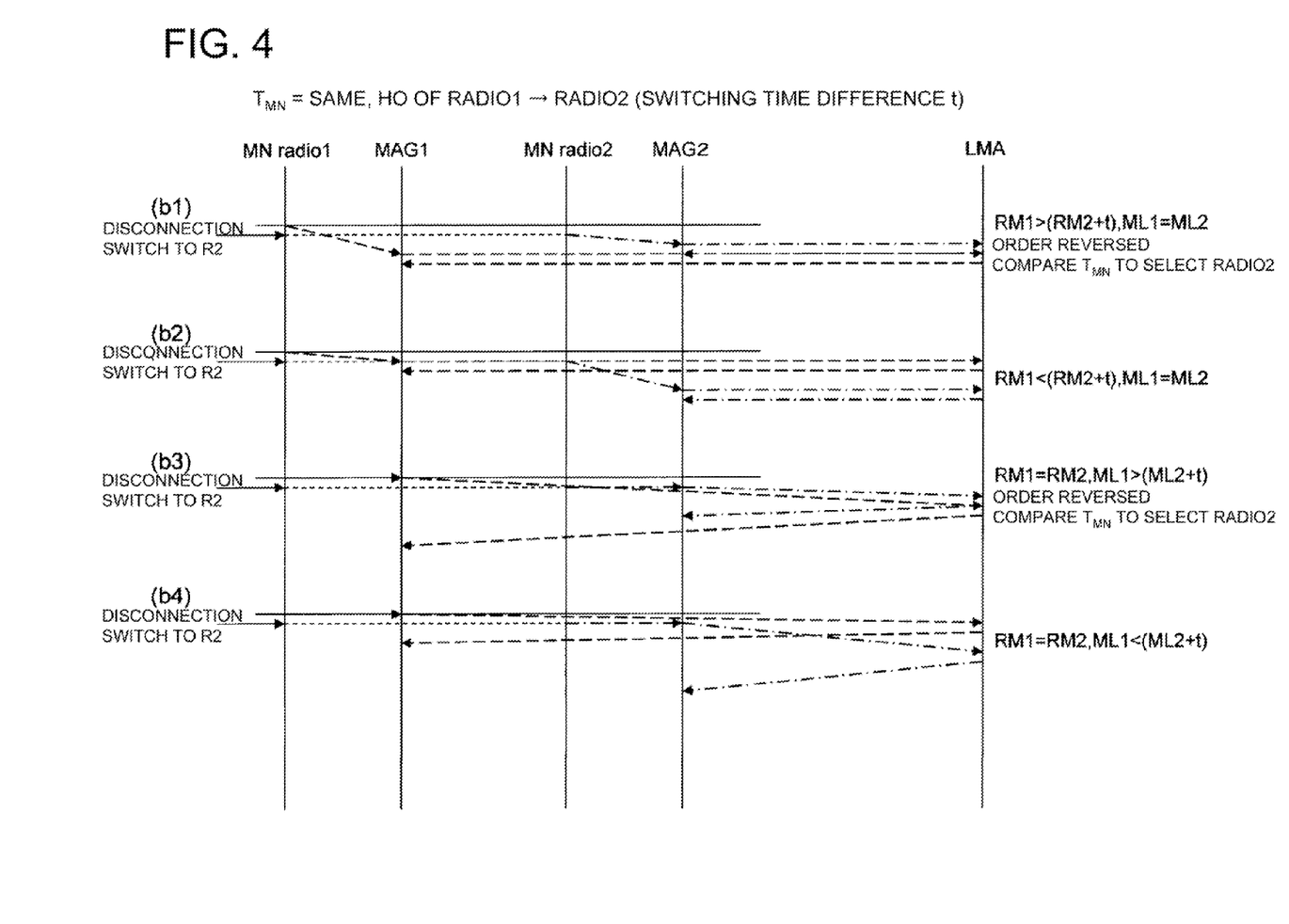
FIG. 4 is a sequence chart showing the order determining operation in the LMA of FIG. 1.

FIG. 4 depicts a sequence chart showing the order judgment operation in the LMA 3 of FIG. 1. Specifically, FIG. 4 shows an operation for a case where hand-over (HO) from a radio communication domain Radio1 to another radio communication domain Radio2 is to be performed, with the time information data (terminal time TMN) managed by the MN 1 being the same.

The LMA 3 exercises registration control for such a case where order reversal has occurred, based on the timing information (w/TMN) in the above mentioned Proxy Binding Update, as shown in FIG. 4. It is assumed here that the time difference of switching between the radio communication domain Radio1 and the radio communication domain Radio2 is t, the time for transmission between the radio communication domain Radio1 and the MAG (1)2-1 is RM1 and that that between the domain of the radio communication domain Radio2 and the MAG (2)2-2 is RM2. It is also assumed that the time for transmission between the domain of the radio communication domain Radio2 and the MAG (2)2-2 is ML1, and that the time for transmission between the MAG (2)2-2 and the LMA 3 is ML2.

Initially, the MN 1 is having communication over the radio communication domain Radio1. After time t, the MN 1 starts its communication over the radio communication domain Radio2. In such case, in a pattern b1, the order reversal of the registration notification messages occurs in a case where the time for transmission RM1 between the domain of the radio communication domain Radio1 and the MAG (1)2-1 is longer than the sum of the time for transmission RM2 between the radio communication domain Radio2 and the MAG (2)2-2 and the time t [RM1>(RM2+t), ML1=ML2].

However, the LM 3 compares the time information data of the MN 1 (time information data w/TMN1 and w/TMN2), sent carried on the registration notification messages from the MAG (1)2-1 and the MAG (2)2-2, and gets results of comparison (w/TMN1<w/TMN2). Hence, the domain of the radio communication domain Radio2 is selected.

In a pattern b2, the time for transmission RM1 between the radio communication domain Radio1 and the MAG 1 is smaller than the sum of the time for transmission RM2 between the domain of the radio communication domain Radio2 and the MAG 2 plus the time t [RM1<(RM2+t), ML1=ML2]. Hence, no order reversal of the registration notification messages occurs.

If, as in a pattern b3, the time for transmission ML1 between the MAG1 and the LMA is longer than the time for transmission ML2 between the MAG 2 and the LMA plus time t [RM1=RM2, ML1>(ML2+t)], order reversal of the registration notification messages occurs.

However, the LMA 3 compares the time information data sent carried on the registration notification messages from the MAG (1)2-1 and MAG (2)2-2 [timing information w/TMN1, w/TMN2], and gets the result of comparison of w/TMN1<w/TMN2. Hence, the LMA 3 selects the radio communication domain Radio2.

In a pattern b4, the time for transmission ML1 between the MAG 1 and the LMA is smaller than the sum of the time for transmission ML2 between the MAG 2 and the LMA and the time t [RM1=RM2, ML1<(ML2+t)]. Hence, no order reversal of the registration notification messages occurs.

Figure 5:
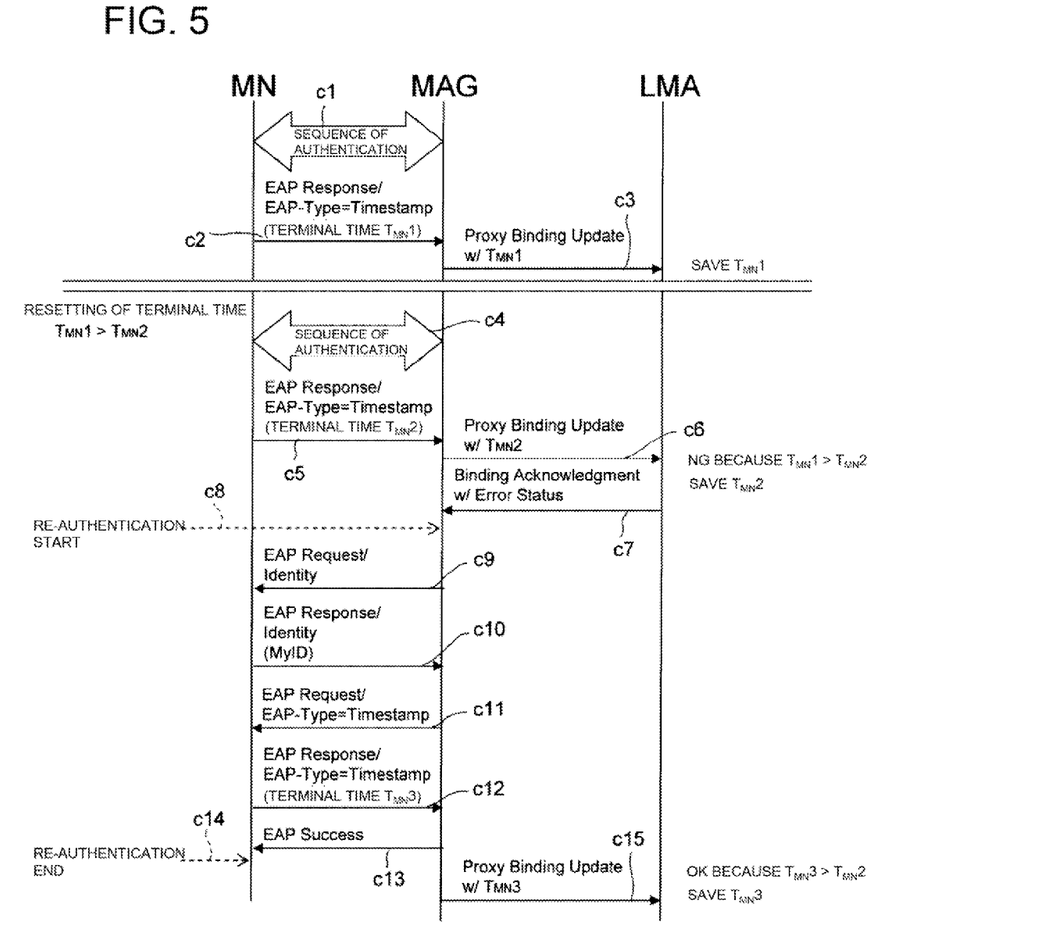
FIG. 5 is a sequence chart showing the operation for the case of the resetting of the time information of the mobile terminal according to an exemplary embodiment of the present invention.

FIG. 5 illustrates the operation in case of resetting of the time information of a mobile terminal in the exemplary embodiment of the present invention. Referring to FIG. 5, the processing in a case where the time on the mobile terminal (MN1) has been reset will now be described. It is assumed that the terminal time TMN1 before resetting of the terminal time has been stored in the LM 3 (c1 to c3 of FIG. 5).

If, after resetting of the terminal time, the terminal time unfortunately has changed to a time older than the time stored in the LMA 3, the registration results in failure. It is because the LMA 3 sees arrival time reversal, as mentioned above in connection with the notification of the time information TMN2 (c4 to c6 of FIG. 5). However, the processing for authentication of the mobile terminal has met with success. The LMA 3 thus saves the time information TMN2 and alerts an error to the MAG 2 (c7 of FIG. 5).

The MAG 2 on receipt of the error re-starts the processing for authentication to acquire the time information from the MN 1 (c8 of FIG. 5). The MAG 2 sends EAP Request/Identity to the MN 1 (c9 of FIG. 5), and receives EAP Response/Identity (c 10 of FIG. 5).

The MAG 2 then transmits EAP Request/EAP-Type=Timestamp to the MN1 (c11 of FIG. 5) to get the time information TMN 3 of the MN 1 (c12 to c14 of FIG. 5). The MAG 2 sends Proxy Binding Update to the LMA 3, using the timing information TMN3 (c15 of FIG. 5). Since TMN3>TMN2, the LMA 3 succeeds in the processing for registration and saves the timing information TMN3 to finish the processing for registration.

Thus, in the present exemplary embodiment, in which the time information of the MN 1 can be acquired by the MAG 2 in the sequence of authentication of the link layer, it is unnecessary for the MN 1 to correct the pre-existing TCP/IP stack. Moreover, in the present exemplary embodiment, in which the above mentioned problem of the related art may be resolved by function addition in the MAG 2 and the LMA 3, correction of the proxy mobile IP protocol between the MAG2 and the LMA 3, now contemplated by IFTF, is unnecessary.

Thus, in the present exemplary embodiment, in which it is possible for the MAG 2 to construct the registration notification message, using the time information managed by the mobile terminal (MN1), there is caused no shift in time synchronization between the MN 1 and the LMA 3. Hence, the order reversal of the registration notification messages in the LMA 3 at the time of switching between the MAGs 2 of the mobile terminal (MN 1) may readily be detected by the LMA 3 without necessitating high-precision synchronization between the MAGs 2.

Moreover, in the present exemplary embodiment, the time information, managed by the MN 1, may be alerted to the MAG 2 by the protocol of the link layer between the mobile terminal (MN 1) and the MAG 2, which MAG 2 formulates a registration notification message. It is thus possible to resolve the problem of reversal of the arrival order of the registration notification messages, at the time of switching processing between the MAGs 2 at the mobile terminal (MN1), without correcting the TCP/IP protocol stack or the proxy mobile IP protocol between the MAGs 2 and the LMA 3.

According to the present invention, described above, the link layer controller 12 of the mobile terminal (MN 1), responsible for the access authentication, is provided with the time management alerting unit 14. The time information acquisition/management unit 23 of the MAG 2 acquires the time information of the MN 1 via the link layer controller 21 of the MAG 2. The PMIP registration unit 22 of the MAG 2 enters the time information of the MN 1 in the registration notification message to alert it to the LMA 3, which LMA 3 performs connection control based on the time information of the MN 1. It is thus possible for the LMA 3 to readily detect the order reversal of the registration notification messages, without the necessitating high precision time synchronization between the MAGs 2, when the mobile terminal (MN 1) switches between the MAGs 2.

The time information alerted from the MN 1 to the LMA 2 according to the present invention is not limited to the time information in the narrow sense of the term. Viz., the sequence number, meaning the number of times of the connection, may be alerted.

The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with and within the gamut of the entire disclosure of the present invention, inclusive of claim and the technical concept of the present invention.

Mode 1

In the following, preferred modes are summarized. (refer to the proxy mobile IP (Internet Protocol) system of the first aspect)

Mode 2

The proxy mobile IP system according to mode 1, wherein the mobility anchor determines the order of the registration notification messages based on the time information alerted from the access gateway as the time information is carried on the registration notification message.

Mode 3

The proxy mobile IP system according to mode 1 or 2, wherein if the mobility anchor has received a registration notification message of the time information older than the time information saved therein, the mobility anchor saves the current time information and alerts an error to the access gateway to acquire the time information of the mobile terminal again.

Mode 4

The proxy mobile IP system according to any one of modes 1-3, wherein the mobile terminal alerts, in place of the time information, a sequence number, indicating the number of times of connection.

Mode 5

An access gateway comprising:

a time information acquisition/management unit alerting, in doing proxy mobile IP registration in proxy mobile IP communication, the time information received from a mobile terminal to a mobility anchor as the time information is carried on a registration notification message.

Mode 6 (Refer to the Method for Determining the Order of Registration Notification Messages of the Second Aspect)

Mode 7

The method for determining the order of registration notification messages according to mode 6, wherein the mobility anchor determines the order of the registration notification messages based on the time information alerted from the access gateway as the time information is carried on the registration notification message.

Mode 8

The method for determining the order of registration notification messages according to mode 6 or 7, wherein if the mobility anchor has received a registration notification message of time information older than the time information saved therein, the mobility anchor saves the current received time information and alerts an error to the access gateway to re-acquire the time information of the mobile terminal.

Mode 9

The method for determining order of registration notification messages according to any one of modes 6-8, wherein the mobile terminal alerts, in place of the time information, a sequence number, indicating the number of times of connection.

Mode 10 (Refer to the Proxy Mobile IP (Internet Protocol) System of the Third Aspect)

Mode 11 (Refer to the Method for Determining the Order of Registration Notification Messages of the Seventh Aspect)

The invention claimed is:

1. A proxy mobile IP system comprising:

a mobile terminal including a time management/notification unit; said time management/notification unit alerting a time information, managed by the mobile terminal itself, to an access gateway at the time of access authentication in proxy mobile IP (Internet Protocol) communication;

said access gateway; said access gateway including a time information acquisition/management unit alerting the time information, received from said mobile terminal, to a mobility anchor, at the time of performing proxy mobile IP registration in said proxy mobile IP communication, as said time information received from said mobile terminal is carried on a registration notification message; and said mobility anchor; said mobility anchor including a time information acquisition/management unit alerting said registration notification message including said time information to a proxy mobile IP registration unit responsible for performing proxy mobile IP registration, wherein if said mobility anchor has received a registration notification message of the time information older than the time information embedded within the registration message and saved in the mobility anchor, said mobility anchor saves the time information of the registration message as the current time information and alerts an error to said access gateway to acquire the time information of said mobile terminal again.

2. The proxy mobile IP system according to claim 1, wherein said mobility anchor determines the order of a plurality of registration notification messages including said registration notification message based on the time information alerted from said access gateway as said time information is carried on said registration notification message.

3. The proxy mobile IP system according to claim 1, wherein said mobile terminal alerts, in place of the time information, a sequence number, indicating the number of times of connection.

4. A method for determining order of registration notification messages, comprising:

a mobile terminal alerting a time information, managed by a mobile terminal itself, to an access gateway at the time of access authentication in proxy mobile IP (Internet Protocol) communication;

said access gateway alerting the time information, received from said mobile terminal, to a mobility anchor at the time of performing proxy mobile IP registration in said proxy mobile IP communication, as said time information received from said mobile terminal is carried on a registration notification message; and said mobility anchor alerting said registration notification message including said time information to a proxy mobile IP registration unit responsible for performing proxy mobile IP registration, wherein if said mobility anchor has received a registration notification message of time information older than the time information embedded within the registration message and saved in the mobility anchor, said mobility anchor saves the time information of the registration message as the current received time information and alerts an error to said access gateway to re-acquire the time information of said mobile terminal.

5. The method for determining the order of registration notification messages according to claim 4, wherein said mobility anchor determines the order of said registration notification messages based on the time information alerted from said access gateway as said time information is carried on said registration notification message.

6. The method for determining order of registration notification messages according to claim 4, wherein said mobile terminal alerts, in place of the time information, a sequence number, indicating the number of times of connection.

7. A proxy mobile IP system in which order of registration notification messages from an access gateway in proxy mobile IP (Internet Protocol) communication, responsible for location management of a mobile terminal over a communication network, is determined by a mobility anchor; comprising said mobile terminal includes a time management/notification unit for managing a time information of the mobile terminal itself; said time management/notification unit working in association with an access authentication function responsible for access authentication in said proxy mobile IP communication;

said access gateway including a time information acquisition/management unit; said time information acquisition/management unit of said access gateway acquiring the time information of said mobile terminal; said time information acquisition/management unit of said access gateway working in association with a proxy mobile IP registration unit; said proxy mobile IP registration unit doing proxy mobile IP registration in an IP proxy mobile IP communication by said access authentication function and by a registration notification message;

said mobility anchor including a time information acquisition/management unit; said time information acquisition/management unit of said mobility anchor acquiring the time information of said mobile terminal and working in association with a proxy mobile IP registration unit; said proxy mobile IP registration unit doing proxy mobile IP registration in said IP proxy mobile IP communication by said registration notification message;

said access gateway alerting the time information, acquired from said mobile terminal in an access authentication sequence by said proxy mobile IP registration unit, to said mobility anchor as said time information is carried on said registration notification message, wherein if said mobility anchor has received a registration notification message of time information older than the time information embedded within the registration message and saved in the mobility anchor, said mobility anchor saves the time information of the registration message as the current received time information and alerts an error to said access gateway to re-acquire the time information of said mobile terminal.

8. A method for determining order of registration notification messages used in a proxy mobile IP (Internet Protocol) system in which the order of registration notification messages from an access gateway in proxy mobile IP (Internet Protocol), responsible for location management of a mobile terminal via a communication network, is determined by a mobility anchor; said method comprising:

providing said mobile terminal with a time management/notification unit; said time management/notification unit managing a time information of the mobile terminal itself and working in association with an access authentication function of performing access authentication in said proxy mobile IP communication;

providing said access gateway with a time information acquisition management unit managing the time information of said mobile terminal; said time information acquisition management unit working in association with an access authentication function of performing access authentication in said proxy mobile IP communication; and providing said mobility anchor with a time information acquisition/management unit acquiring the time information of said mobile terminal; said time information acquisition/management unit working in association with a proxy mobile IP registration unit; said proxy mobile IP registration unit doing proxy mobile IP registration in an IP proxy mobile IP communication by one of said registration notification messages;

said access gateway entering said time information acquired from said mobile terminal in an access authentication sequence with said proxy mobile IP registration unit in said one of said registration notification messages to alert said time information to said mobility anchor, wherein if said mobility anchor has received a registration notification message of time information older than the time information embedded within the registration message and saved in the mobility anchor, said mobility anchor saves the time information of the registration message as the current received time information and alerts an error to said access gateway to re-acquire the time information of said mobile terminal.

* * * * *